(12) United States Patent
Ravindran et al.

(10) Patent No.: US 10,412,453 B2
(45) Date of Patent: Sep. 10, 2019

(54) PROBABILITY WEIGHTED DASH BASED VIDEO STREAMING OVER AN INFORMATION-CENTRIC NETWORK

(71) Applicant: Futurewei Technologies, Inc., Plano, TX (US)

(72) Inventors: Ravishankar Ravindran, San Ramon, CA (US); Aytac Azgin, Santa Clara, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 67 days.

(21) Appl. No.: 14/881,565

(22) Filed: Oct. 13, 2015

(65) Prior Publication Data
US 2017/0105044 A1 Apr. 13, 2017

(51) Int. Cl.
*H04N 21/466* (2011.01)
*H04N 21/437* (2011.01)
(Continued)

(52) U.S. Cl.
CPC ... *H04N 21/4663* (2013.01); *H04N 21/23106* (2013.01); *H04N 21/23439* (2013.01);
(Continued)

(58) Field of Classification Search
CPC ......... H04N 21/4663; H04N 21/23106; H04N 21/4382; H04N 21/64738; H04N 21/8402
See application file for complete search history.

(56) References Cited

U.S. PATENT DOCUMENTS

| 2004/0128386 A1* | 7/2004 | Oomoto | H04L 69/329 709/226 |
| 2005/0083840 A1* | 4/2005 | Wilson | H04L 47/10 370/230 |

(Continued)

FOREIGN PATENT DOCUMENTS

JP WO 2015087449 A1 * 6/2015 ........... G06F 9/5088

OTHER PUBLICATIONS

"Information Technology—Dynamic Adaptive Streaming over HTTP (DASH)—Part 1: Media Presentation Description and Segment Formats," International Standard ISO/IEC 23009-1, First Edition, Apr. 1, 2012, 134 pages.
(Continued)

*Primary Examiner* — Joshua D Taylor
(74) *Attorney, Agent, or Firm* — Conley Rose, P.C.

(57) ABSTRACT

A method for video streaming over at least one information-centric network (ICN), comprising transmitting a request for video content to a server, receiving a media presentation description (MPD) file corresponding to the video content from the server in response to the request for the video content, wherein the MPD file identifies names of copies of the video content in the at least one ICN, and wherein the copies of the video content represent different quality levels of the video content, probing the at least one ICN for the copies of the video content by searching the names of the copies, calculating a probability for each of the copies of the video content based on results of the probing, and fetching one of the copies of the video content based on the probability calculated for each of the copies of the video content.

23 Claims, 5 Drawing Sheets

(51) Int. Cl.

| | | |
|---|---|---|
| *H04N 21/2343* | (2011.01) | |
| *H04N 21/647* | (2011.01) | |
| *H04N 21/438* | (2011.01) | |
| *H04N 21/231* | (2011.01) | |
| *H04N 21/84* | (2011.01) | |
| *H04N 21/262* | (2011.01) | |
| *H04N 21/442* | (2011.01) | |
| *H04N 21/845* | (2011.01) | |

(52) U.S. Cl.
CPC ..... *H04N 21/26258* (2013.01); *H04N 21/437* (2013.01); *H04N 21/4382* (2013.01); *H04N 21/44209* (2013.01); *H04N 21/4668* (2013.01); *H04N 21/64738* (2013.01); *H04N 21/8402* (2013.01); *H04N 21/8456* (2013.01)

(56) References Cited

U.S. PATENT DOCUMENTS

| | | | | |
|---|---|---|---|---|
| 2006/0045138 | A1* | 3/2006 | Black | G10L 19/005 370/516 |
| 2007/0294415 | A1* | 12/2007 | Kelder | H04L 65/80 709/227 |
| 2010/0332567 | A1* | 12/2010 | Samadani | G06F 17/30053 707/912 |
| 2010/0332674 | A1* | 12/2010 | van Gassel | H04L 67/104 709/231 |
| 2013/0060962 | A1* | 3/2013 | Wang | H04L 67/327 709/238 |
| 2013/0219081 | A1 | 8/2013 | Qian et al. | |
| 2014/0250230 | A1* | 9/2014 | Brueck | H04L 65/607 709/226 |
| 2015/0200991 | A1* | 7/2015 | Kwon | H04L 65/608 709/219 |
| 2015/0358379 | A1* | 12/2015 | Wood | H04L 65/601 709/231 |
| 2016/0004552 | A1* | 1/2016 | Innan | G06F 9/5088 718/1 |

OTHER PUBLICATIONS

"Information Technology—Generic Coding of Moving Pictures and Associated Audio Information: Systems" International Standard ISO/IEC 13818-1, Second Edition, Dec. 1, 2000, 174 pages.

Qian, et al., "Probability-Based Adaptive Forwarding Strategy in Named Data Networking," Proceedings of IFIP/IEEE IM Workshop: 5th International Workshop on the Management of the Future Internet (ManFI), Ghent, Belgium, May 2013, 8 pages.

* cited by examiner

PROBABILITY WEIGHTED DASH BASED VIDEO STREAMING OVER AN INFORMATION-CENTRIC NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A video content provider or distributor may deliver various video contents to subscribers or users using different encryption and/or coding schemes suited for different devices (e.g., televisions, laptops, desktop computers, and mobile handsets). The video content provider may support a plurality of media encoders and decoders (codecs), media players, video frame rates, spatial resolutions, bit rates, video formats, or combinations thereof. Video contents may be converted from a source representation to various other representations to suit the different client devices. In adaptive streaming, the video client may dynamically select appropriate representations of the video contents, based on a variety of factors, such as network conditions, device capability, and user choice. The video client may also choose among various adaptation sets of the video contents according to a user input, such as for example, enabling or disabling subtitles or selecting a language.

SUMMARY

In an embodiment, the disclosure includes a method for video streaming over at least one information-centric network (ICN) comprising transmitting a request for video content to a server, receiving a media presentation description (MPD) file corresponding to the video content from the server in response to the request for the video content, wherein the MPD file identifies names of copies of the video content in the at least one ICN, and wherein the copies of the video content represent different quality levels of the video content, probing the at least one ICN network for the copies of the video content by searching the names of the copies, calculating a probability for each of the copies of the video content based on results of the probing, and fetching one of the copies of the video content based on the probability calculated for each of the copies of the video content.

In another embodiment, the disclosure includes a video client comprising a transmitter configured to transmit a request for video content to a server, and a processor operably coupled to a memory and the transmitter, wherein the memory comprises computer executable instructions stored in a non-transitory computer readable medium such that when executed by the processor causes the processor to receive an MPD file corresponding to the video content from the server in response to the request for the video content, wherein the MPD file identifies names of copies of the video content in at least one ICN, and wherein the copies of the video content represent different quality levels of the video content, probe the at least one ICN for the copies of the video content by searching the names of the copies, calculate a probability for each of the copies of the video content based on results of the probing, and fetch one of the copies of the video content based on the probability calculated for each of the copies of the video content.

In yet another embodiment, the disclosure includes a video client comprising a video service application configured to transmit a request for video content to a server, and receive an MPD file corresponding to the video content from the server in response to the request, wherein the MPD file identifies names of copies of the video content in at least one ICN, and wherein the copies of the video content represent different quality levels of the video content, a content probing module operably coupled to the video service application and configured to probe the at least one ICN for the copies of the video content by searching the names of the copies, a probability calculating module operably coupled to the content probing module and configured to calculate a probability for each of the copies of the video content based on results of the probing, and output the probabilities of the copies of the video content in a video quality probability weight table.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
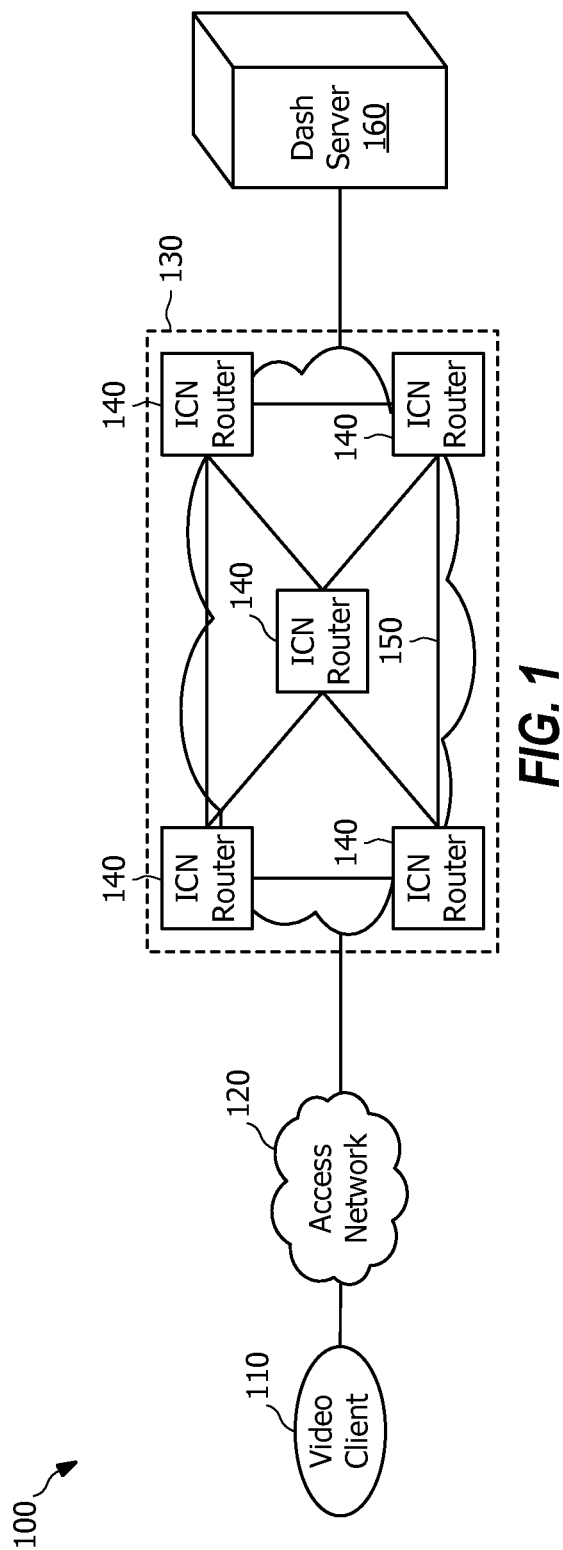
FIG. 1 is a schematic diagram of a dynamic adaptive streaming over hypertext transfer protocol (DASH) system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Moving Picture Expert Group (MPEG) has proposed a dynamic adaptive streaming over hypertext transfer protocol (HTTP) (DASH) protocol for adaptive streaming multimedia over a network. The DASH protocol is described in International Organization of Standardization (ISO)/International Electrotechnical Commission (IEC) 13818-1, second edition, published on Dec. 1, 2000, entitled, "Information Technology—Generic Coding of Moving Pictures and Associated Audio Information: Systems," and ISO/IEC 23009-1, fifth edition, published on Apr. 1, 2012, entitled, "Information Technology—Dynamic Adaptive Streaming over HTTP (DASH)—part 1: Media Presentation Description and Segment Formats," which are incorporated herein by reference.

When employing the DASH protocol for video streaming, a DASH server, upon request, transmits a media presentation description (MPD) file to a video client. The MPD file is an extensible markup language (XML) document, and describes video content as segments, each of which is defined as a unit of data in ISO/IEC 23009-1. The MPD file also describes how such segments may be utilized to present the video content to a user. For example, the MPD file may describe segment timing, segment ranges, and uniform resource locator (URL) information indicating where such segments may be obtained.

Currently, the DASH protocol is employed in an Internet Protocol (IP) network. The client needs to know the IP address of the DASH server in order to transmit a request for the video content to the DASH server through the IP network. In the meanwhile, the DASH server must know the IP address of the client in order to transmit the video content to the client through the IP network. As a result, service interruptions occur often when at least one of the DASH server and the video client changes the IP addresses.

An information-centric network (ICN) may be an ideal replacement of the IP network in order to resolve such issue. One aspect of the ICN that may be different from the IP network is the ability of the ICN to route the video content according to the name of the video content, interconnect multiple geographical points, cache the video content temporarily or store the video content on a persistent basis, and apply computational logic on the video content. As such, the video client and the DASH server do not need to know the IP addresses of each other in order to communicate the video content. This may allow the video content to be served from the network instead of an original server, and thus may improve speed of video content delivery. The caching/storing may be used for real time data fetched by the video client or for persistent data belonging to the user or to a content provider, e.g., a third party provider. It should be noted that the ICN may be employed to implement any suitable adaptive streaming protocols, which is not limited to the DASH protocol.

FIG. 1 is a schematic diagram of a DASH system 100. The DASH system 100 includes a DASH server 160, an ICN 130, an access network 120, and a video client 110. The DASH system 100 may be arranged as shown or in any other suitable manner.

The DASH server 160 is in communication with the video client 110 and the ICN 130 via a content-centric networking (CCN) protocol. The DASH server 160 is configured to transmit an MPD file to the video client 110 directly in response to a MPD request from the video client 110. The DASH server 160 is further configured to store copies of the video content (e.g., in a memory or cache) and/or forward the copies of the video content to the ICN. The copies of the video content may represent different quality levels of the video content. In other words, each copy of the video content may have a different quality level. For example, a first copy of the video content may have a 480 pixel (p) resolution, a second copy of the video content may have a 360p resolution, a third copy of the video content may have a 280p resolution, and so on. It should be noted that any number of copies of the video content at varying levels of quality may be present within the ICN 130.

Each copy of the video content is associated with a name. In addition to the MPD file further indicating the quality level that each copy of the video content represents, the MPD file also identifies the names of each copy of the video content.

In an embodiment, the DASH server 160 forms a portion of a content delivery network (CDN), which may refer to a distribution system of servers, deployed in multiple data centers over multiple backbones for the purpose of delivering content. A CDN may comprise one or more DASH servers 160. Although FIG. 1 illustrates the DASH server 160, other servers such as origin servers, web servers, and/or any other suitable type of server may store the copies of the video content.

The ICN 130 comprises a plurality of ICN routers 140 interconnected with links 150. The links 150 may be physical links (e.g., electrical cables and/or optical fibers), virtual links, wireless links, or some combination thereof. The ICN 130 is configured to receive the copies of the video content from the DASH server 160, cache the copies of the video content in the ICN routers 140, route the copies of the video content according to their names in the ICN router 140, and/or forward the copies of the video content to the video client 110 via the access network 120.

The access network 120 is configured to connect the video clients 110 to the ICN 130. The access network 120 may include one or more wireless access points (AP) such as wireless fidelity (WiFi) routers. In such cases, the access network 120 may connect the video clients 110 to the ICN 130 via WiFi communication.

The video client 110 may be a laptop, a tablet computer, a desktop computer, a mobile telephone, or any other device. The video client 110 is configured to parse an MPD file received from the ICN 130. The MPD file is parsed to retrieve information regarding copies of the video content. The information may include, for example, availability of the copies of the video content, resolutions of the copies of the video content, minimum and/or maximum bandwidths, existence of various encoded alternatives of media components, accessibility features and required digital right management (DRM), and/or other characteristics of the copies of the video content.

The video client 110 is configured to fetch copies of the video content by routing on their names according to the MPD file. In principle, the video client 110 attempts to fetch the copy of the video content representing the highest quality level of the video content that the current network bandwidth can handle. However, there are several technical challenges for video streaming over ICN 130. First, it is difficult to determine the available quality levels of the video content in the ICN when more than one user may fetch the same video content. Second, it is difficult to determine which of the ICN routers 140 in the ICN 130 caches the highest quality of the video content efficiently.

Disclosed herein are various embodiments for probability weighted DASH based video streaming over at least one ICN. As noted above, copies of the video content at varying quality levels may be cached in the at least one ICN. The at least one ICN may include any local ICN end points and/or other ICN reachable through network interfaces, A video client attempts to fetch the copy of the video content representing the highest quality level that the current network bandwidth can handle. Instead of estimating which ICN router in the ICN caches such copy of the video content, the video client keeps track of all of the copies of the video content in the ICN, calculates a probability for each copy of the video content, and determines which copy of the video content will be fetched based on the calculated probabilities. In an embodiment, the video client includes a video service application, a content probing module, a context monitoring module, a probability calculating module, and a content fetching module. The video service application transmits a request for the video content to a DASH server and receives an MPD file corresponding to the video content from the DASH server in response to the request. The MPD file identifies copies of the video content having the different quality levels, and identifies names of the copies of the video content. The content probing module probes the at least one ICN for the copies of the video content by searching the names of the copies of the video content according to the MPD file. In an embodiment, the content probing module probes each ICN at predetermined intervals (e.g., every 10 milliseconds (ms)). The context monitor module monitors environmental changes and informs the content probing module and/or the content fetching module of the environmental changes. The probability calculating module calculates a probability for each of the copies of the video content based on results of the probing, outputs the probabilities of the copies of the video content in a video quality probability weight table, and ranks the video quality probability weight table in a decreasing order of the probabilities for each quality level from the highest quality level to the lowest quality level following output of the probabilities. Finally, the content fetching module fetches one of the copies of the video content in the at least one ICN whose probability is the first in the video quality probability weight table above a predetermined threshold. The predetermined threshold may correspond to de jitter buffer utilization. The predetermined threshold may increase when the de jitter buffer of the content fetching module underruns (e.g., due to network congestion and/or low network bandwidth).

Figure 2:
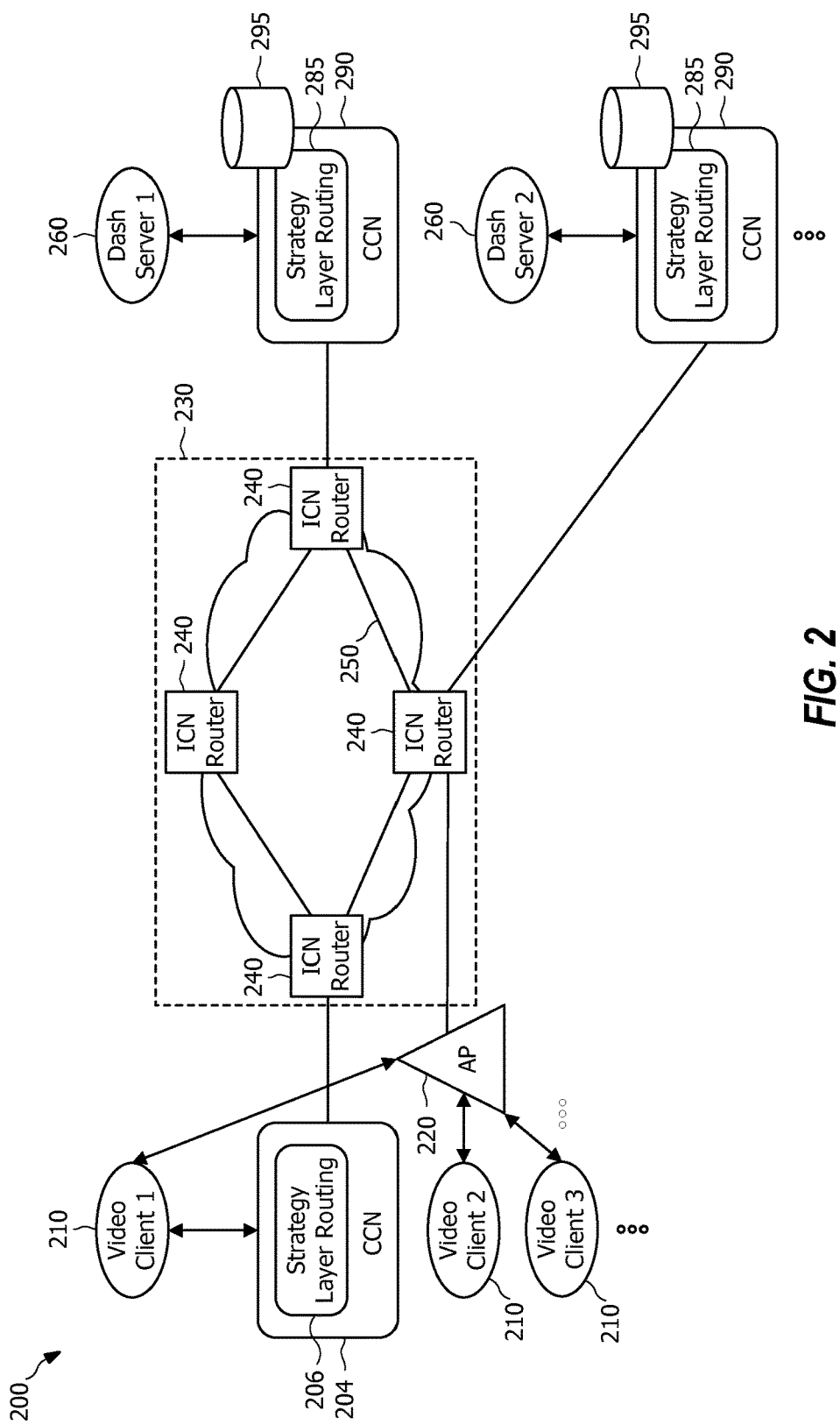
FIG. 2 is a schematic diagram of a DASH system according to an embodiment of the disclosure.

FIG. 2 is a schematic diagram of a DASH system 200 according to an embodiment of the disclosure. The DASH system 200 comprises a plurality of video clients 210, an access point (AP) 220, an ICN 230, and a plurality of DASH servers 260. The video clients 210 are similar to the video clients 110 of FIG. 1 in many aspects. However, as more fully explained below in connection with FIG. 3, the video clients 210 of FIG. 2 include additional components, modules, and/or features permitting implementation of the inventive concepts disclosed herein.

The ICN 230 and DASH servers 260 are similar to the ICN 130 and DASH servers 160 of FIG. 1, respectively. The ICN 230 comprises a plurality of ICN routers 240 interconnected with each other with links 250. The ICN routers 240 and links 250 are similar to the ICN routers 140 and links 150 of FIG. 1, respectively. The DASH system 200 may be configured as shown or in any other suitable manner.

The AP 220 may be a router, a WiFi router, or other network element. The AP 200 may be configured similarly to the access network 120 of FIG. 1. In an embodiment, the AP 220 establishes communications between each of the video clients 210 and the ICN 230 by implementing strategy layer routing 206 according to the CCN protocol 204. In an embodiment, the video clients 210 communicate with the ICN 230 directly by implementing the strategy layer routing 206 according to the CCN protocol 204. The strategy layer routing 206 permits a communication channel to be established dynamically between the video clients 210 and the ICN 230.

Each of the plurality of DASH servers 260 may store at least a portion of the copies of the video content in a repository 295. The DASH servers 260 forward the copies of the video content to the ICN 230 by implementing the strategy layer routing 285 according to the CCN protocol 290. The strategy layer routing 285 is implemented to establish a communication channel between each DASH server 260 and the ICN 230.

Figure 3:
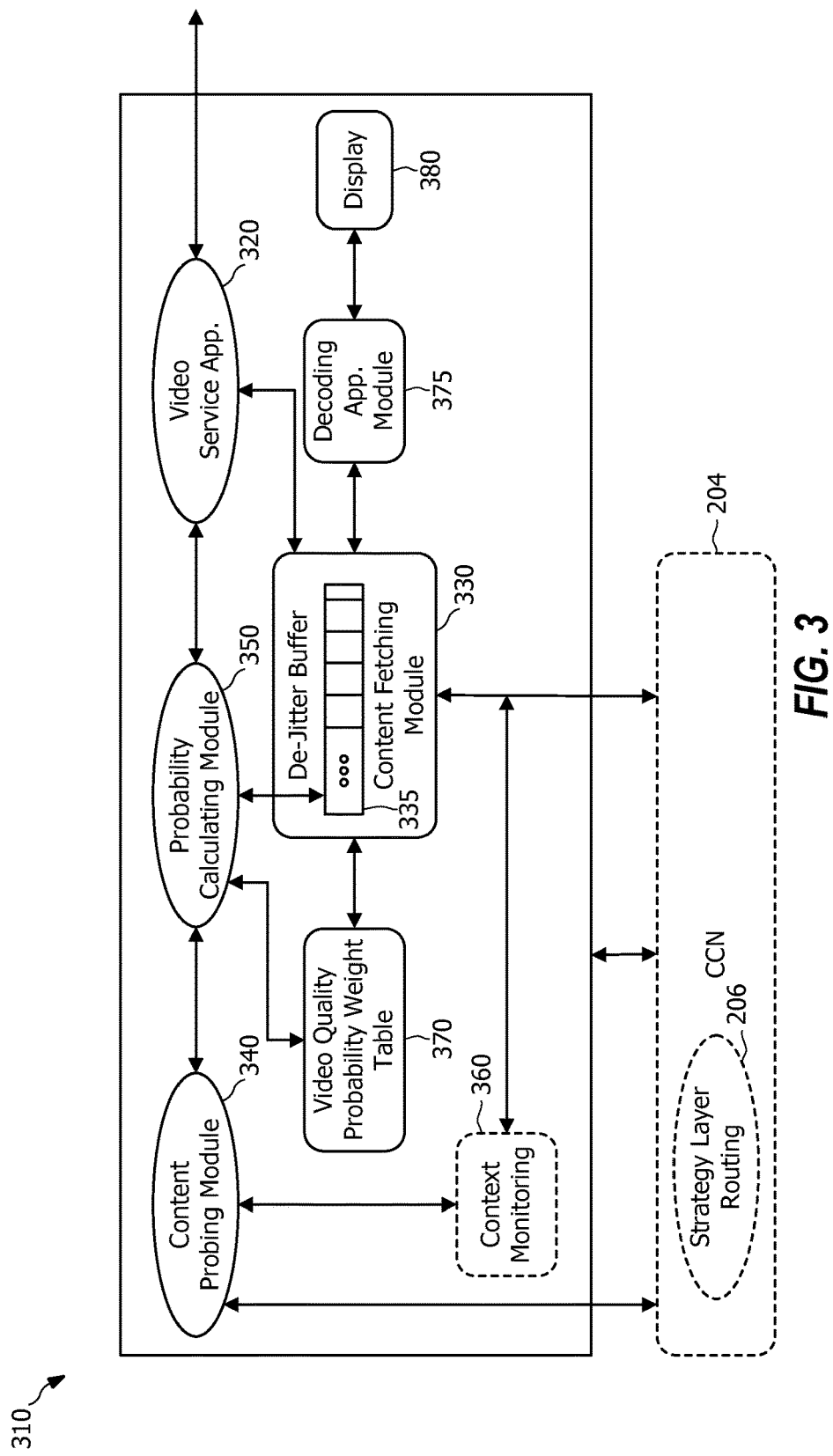
FIG. 3 is a schematic diagram of the video client according to an embodiment of the disclosure.

FIG. 3 is a schematic diagram of the video client 310 according to an embodiment of the disclosure. The video client 310 may be similar to the video client 210 of FIG. 2. The video client 310 comprises a video service application 320, a content probing module 340, a context monitoring module 360, a probability calculating module 350, a content fetching module 330, a decoding application module 375, and a display 380. The video client 310 may communicate with the ICN 230 by implementing the strategy layer routing 206 according to the CCN protocol 204 of FIG. 2. The video client 310 may be configured as shown or in any other suitable manner.

The video service application 320 is configured to transmit a request for video content to one or more of the DASH servers 260 of FIG. 2. The video service application 320 is also configured to receive an MPD file corresponding to the video content from one or more of the DASH servers 260 of FIG. 2 in response to the request for video content. The video service application 320 is further configured to distribute the MPD file to the content probing module 340, the probability calculating module 350, and the content fetching module 330. The MPD file identifies copies of the video content at varying quality levels within the ICN 230 of FIG. 2. The MPD file also identifies the names of the copies of the video content.

The content probing module 340 is configured to probe the ICN 230 of FIG. 2 for the copies of the video content by searching the names of the copies according to the MPD file. The probability calculating module 350 is coupled to the content probing module 340, the video service application 320, and the content fetching module 330. The probability calculating module 350 is configured to calculate a probability corresponding to each of the copies of the video content. The probability calculating module 350 then outputs the probabilities to a video quality probability weight table 370, which may be stored in a memory of the video client 310. The manner in which the probability for each of the copies of the video content is calculated will be described in further detail below.

The context monitor module 360 is coupled to the content probing module 340 and the content fetching module 330. The context monitor module 360 is configured to monitor environmental changes, such as a change in location and/or network environment. For example, the context monitoring module 360 may detect an environmental change when the video client 310 (e.g., a smart phone) of FIG. 2 moves from a Wi-Fi network environment to a long-term evolution (LTE) network environment. The context monitor module 360 is further configured to inform the content probing module 340 and/or the content fetching module 330 of the environmental changes.

The content fetching module 330 is coupled to the probability calculating module 350, the video service application 320, and the decoding application module 375. In addition, the content fetching module 330 is accessible to the video quality probability weight table 370. The content fetching module 330 is configured to fetch one of the copies of the video content based on the video quality probability weight table 370. The content fetching module 330 comprises a de-jitter buffer 335 to store the fetched copy of the video content and forward each segment of the fetched copy of the video content to the decoding application module 375 at a steady pace for smooth video streaming.

The decoding application module 375 is coupled to the content fetching module 330 and the display 380. The decoding application module 375 is configured to receive each segment of a copy of the video content from the content fetching module 330, decode the copy of the video content, and forward the decoded copy of the video content to the display 380. The display 380 is coupled to the decoding application module 375. The display 380 is configured to receive the decoded copy of the video content from the decoding application module 375 and present the decoded copy of the video content for viewing.

In operation, the video service application 320 of FIG. 3 transmits a request for video content to one or more of the DASH servers 260 of FIG. 2. The video service application 320 receives an MPD file corresponding to the video content from one or more of the DASH servers 260 in response to the request. The video service application 320 distributes the MPD file to the content probing module 340, the probability calculating module 350, and the content fetching module 330. The MPD file identifies the various copies of the video content at different quality levels that are available within the ICN 230 of FIG. 2. In other words, the MPD file indicates that a copy of the video content at different quality levels may be fetched. The MPD file further identifies the names of the copies of the video content.

In determining which copy of the video content is going to be fetched, the content probing module 340 probes the ICN 230 for the copies of the video content by searching the names of copies of the video content according to the MPD file. In an embodiment, the content probing module 340 probes for all the copies of the video content in the ICN 230 at the same time. In an embodiment, the content probing module 340 may probe the copies of the video content according to a predefined order. For example, the content probing module 340 may probe a copy of the video content representing a lower quality level of the video content before a copy of the video content representing a higher quality level of the video content, or vice versa. In an embodiment, the content probing module 340 may probe the ICN 230 for the copies of the video content in the ICN 230 every a predetermined time period. The predetermined time period may be any time interval. For example, the predetermined time period may be 10 ms.

In an embodiment, the content probing module 340 employs packet internet groper (PING) to probe the ICN 230 for the copies of the video content according to the names of the copies of the video content through a broadcast or a unicast interface. In some examples, more than one ICN 230 exists in vicinity of the video client 310. As such, the content probing module 340 employs PING to probe all the ICNs 230 in vicinity of the video client 310 for the copies of the video content according to the names of the copies of the video content. The PING operates by sending packets to the ICN 230. Each packet may be utilized to probe for one of the copies of the video content in the ICN 230. When a packet matches the name of the corresponding copy of the video content in the ICN 230, the packet returns to the content probing module 340 with an indication that the corresponding copy of the video content is found in the ICN 230. The packet returned to the content probing module 340 further indicates the available bandwidth of the ICN 230. Additionally, the round-trip time (RTT) from transmission to reception of the packet is measured by the content probing module 340. Meanwhile, the context monitoring module 360 monitors the environmental changes and informs the content probing module 340 and/or the content fetching module 330 of the environmental changes, which may influence the strategy layer routing 206 according to the CCN protocol 204. For example, a different communication channel between the video client 310 and the ICN 203 may be established through the strategy layer routing 206 according to the CCN protocol 204 when the environmental changes are detected by the context monitoring module 360.

The probability calculating module 350 calculates a probability of each copy of the video content based on various factors such as the RTT of probing for each of the copies of the video content and the number of different content copies as indicated in the MPD file. The various factors may further include de jitter buffer utilization in the content fetching module 330 and the RTT of probing for the copy of the video content currently presented in the display 380. In an embodiment, the calculation may be performed based on ant colony optimization. Details about the calculation are described in Haiyang Qian, et. al., "Probability-based adaptive forwarding strategy in named data networking," 2013 International Federation for Information Processing (IFIP)/Institute of Electrical and Electronics Engineers (IEEE) International Symposium on Integrated Network Management (IM 2013), pages 1094-1101, May 27-31, 2013 in Ghent, Belgium. In an embodiment, the probability may be one of the various factors such as the RTT of probing for each of the copies of the video content.

The probability calculating module 350 outputs the probabilities of the copies of the video content in the video quality probability weight table 370. Each entry of the video quality probability weight table 370 corresponds to a probability of a copy of the video content. The probability may be denoted by an identifier and represented in the following format: /<content-name>/<quality>/[chunk-range]. In this example, <Content-name> indicates the name of the copy of the video content, <quality> indicates the quality level of the video content that the copy of the video content represents, and [chunk-range] specifies the video content. For example, a video may include 10 media chunks. When [chunk-range] is from 1 to 4, it is indicated that the video content corresponds to the first four media chunks of the video. The probability calculating module 350 also ranks the video quality probability weight table 370 in a decreasing order of the probabilities for each quality level from the highest quality level to the lowest quality level.

Table 1 is an example of the video quality probability weight table 370. In this example, seven copies of a video content represent three quality levels of the video content as follows: a high quality level of the video content (e.g., 480p resolution), a medium quality level of the medium content (e.g., 360p resolution), and a low quality level of the video content (e.g., 240p resolution). The first column of Table 1 indicates different ICNs 230 in vicinity of the client device 310 that cache the copies of the video content. The different ICNs 230 may include a local area network (LAN) and a wide area network (WAN). The content probing module 340 of the client device 310 may probe the LAN and the WAN for the copies of the video content through different interfaces. As shown, the fourth copy of the video content and the sixth copy of the video content are cached in the WAN, while the other copies of the video content are cached in the LAN. The next three columns of Table 1 indicate the identifiers of the copies of the video content. Specifically, the second column of Table 1 indicates the names of the copies of the video content. The third column of Table 1 indicates the quality levels of the video content that the copies of the video content represent. The fourth column of Table 1 indicates the chunk range of the video that the video content corresponds to. As shown, all the copies of the video content represent the same video content which comprises the first four chunks of a video. The first two copies of the video content named "High1" and "High2" represent a high quality level of the video content. The next three copies of the video content named "Medium1," "Medium2," and "Medium3" represent a medium quality level of the video content. The last two copies of the video content named "Low1" and "Low2" represent a low quality level of the video content. The fifth column of Table 1 indicates the probabilities of the copies of the video content calculated with various factors based on the ant colony optimization as mentioned above. In some other examples, the probabilities of the copies of the video content may be a Quality of Service (QoS) value, such as the delays.

TABLE 1

An example of the video quality probability weight table 370

| ICN | Content Name | Quality | Chunk Range | Probability |
|-----|--------------|---------|-------------|-------------|
| LAN | High1        | High    | 1-4         | 20%         |
| LAN | High2        | High    | 1-4         | 15%         |
| LAN | Medium1      | Medium  | 1-4         | 40%         |
| WAN | Medium2      | Medium  | 1-4         | 10%         |
| LAN | Medium3      | Medium  | 1-4         | 5%          |
| WAN | Low1         | Low     | 1-4         | 8%          |
| LAN | Low2         | Low     | 1-4         | 2%          |

In order to present the best quality of the video content in the display 380 adapted to the network condition, the content fetching module 330 fetches the first copy of the video content in the video quality probability weight table 370 whose probability is above a predetermined threshold. The predetermined threshold corresponds to a current de jitter buffer 335 utilization based on the current network condition. Therefore, the predetermined threshold may change from time to time due to the dynamic nature of the network condition. For example, when the de jitter buffer 335 underruns due to network congestions or a low network bandwidth, the predetermined threshold may increase so that the probabilities of the copies of the video content representing the high quality level of the video content may be below the predetermined threshold. As a result, the content fetching module 330 may determine to fetch the copy of the video content representing the medium quality level or the low quality level of the video content rather than that representing the high quality level of the video content due to the network condition changes, which may be detected by the context monitoring module 360.

Referring to Table 1, when the predetermined threshold is 10%, the content fetching module 330 determines to fetch the copy of the video content named "High1" whose probability is 20%. Alternatively, when the predetermined threshold changes to 35% (e.g., when the de jitter buffer 335 underruns due to network congestion, etc.), the content fetching module 330 determines to fetch the copy of the video content named "Medium1" rather than the copies of the video content named "High1" and "High2," whose probabilities are below the predetermined threshold.

After the content fetching module 330 determines which copy of the video content to be fetched according to the video quality probability weight table 370, the content fetching module 330 transmits a request for the copy of the video content to the ICN 230 through the strategy layer routing 206 according to the CCN protocol 204 of FIG. 2. The ICN router 240 caching the copy of the video content transmits the copy of the video content to the content fetching module 330 through the strategy layer routing 206 in response to the request, which is queued in the de jitter buffer 335. The decoding application module 375 decodes each segment of the copy of the video content queued in the de jitter buffer 335 and forwards the decoded copy of video content to the display 380, where the decoded copy of the video content is presented. In an embodiment, the display 380 may be a liquid crystal display (LCD). In an embodiment, the content fetching module 330 is configured to proactively upgrade or degrade video quality content based on de jitter occupancy by consulting the video quality probability weight table 370. In an embodiment, the probability calculating module 350 is configured to advise the content fetching module 330 that a higher quality video content (relative to previously fetched video content) is available and to recommend that the content fetching module 330 upgrade to the higher quality video content.

Figure 4:
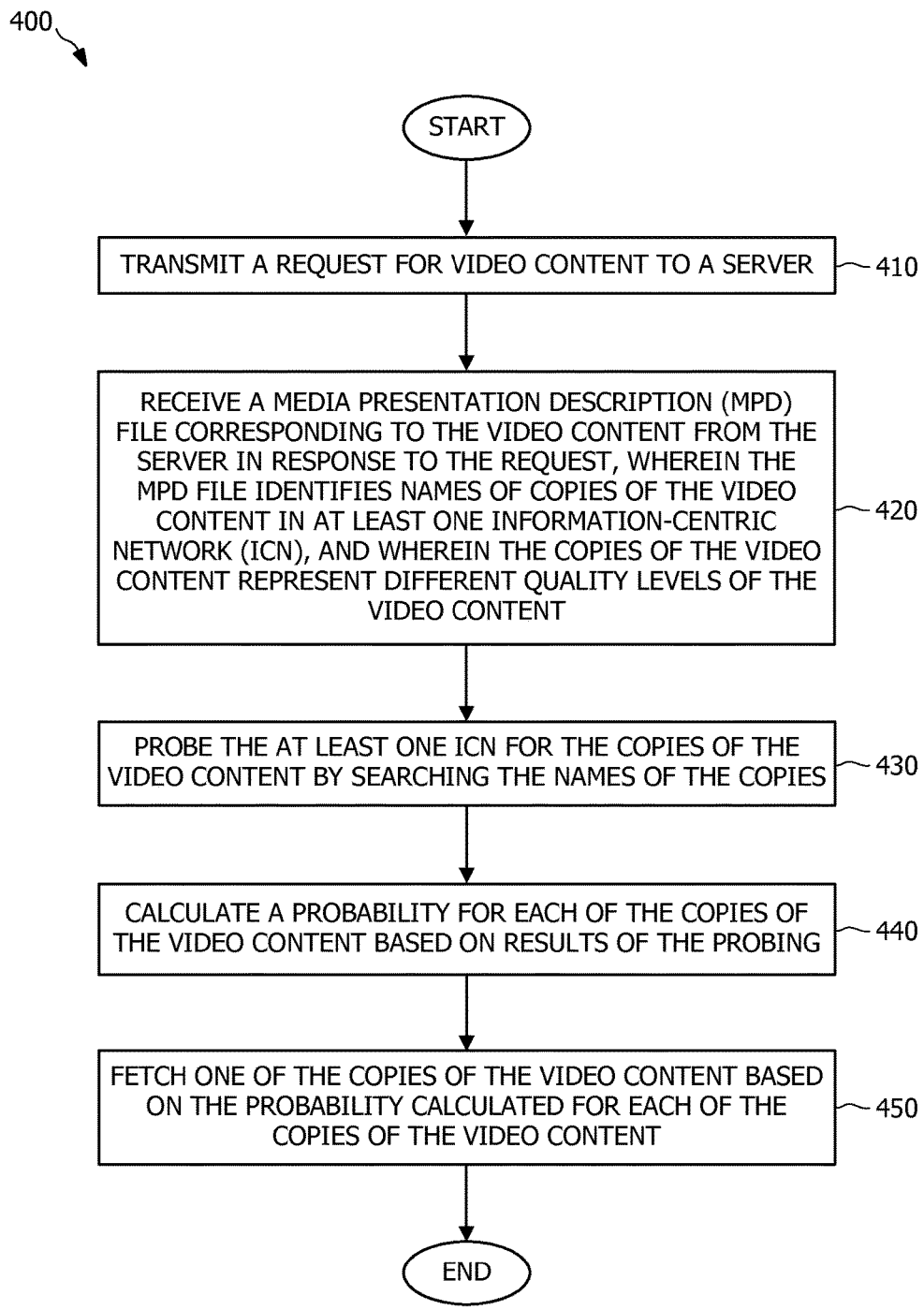
FIG. 4 is a flowchart illustrating a method of probability weighted DASH based video streaming over ICN according to an embodiment of the disclosure.

FIG. 4 is a flowchart illustrating a method 400 of probability-weighted, DASH-based video streaming over an ICN according to an embodiment of the disclosure. The method 400 may be performed in a video client (e.g., the video client 210, 310) when a user requests a video streaming service for a video content. At step 410, a request for video content is transmitted to a server (e.g., the DASH server 260). At step 420, an MPD file corresponding to the video content is received from the server (e.g., the DASH server 260) in response to the request for the video content. The MPD file identifies names of copies of the video content in at least one ICN (e.g., the ICN 230). The copies of the video content represent different quality levels of the video content. In other words, each of the various copies of the video content in the at least one ICN may have a different quality level.

At step 430, the at least one ICN (e.g., the ICN 230) is probed for the copies of the video content by searching the names of the copies according to the MPD file. In an embodiment, each ICN (e.g., the ICN 230) is probed for the copies of the video content through a broadcast or a unicast interface at a regular interval (e.g., every 10 ms).

At step 440, a probability is calculated for each of the copies of the video content based on the probing results. The probing results may include the RTT of probing each ICN (e.g., the ICN 230) for each copy of the video content. Calculation of the probability for each of the copies of the video content may be further based on the number of different copies of the video content as indicated in the MPD file, de jitter buffer (e.g., the de jitter buffer 335) utilization in a content fetching module (e.g., the content fetching module 330), and/or the RTT of probing for the copy of the video content which is currently presented in a display (e.g., the display 380). In an embodiment, the calculation may be performed using ant colony optimization.

Figure 5:
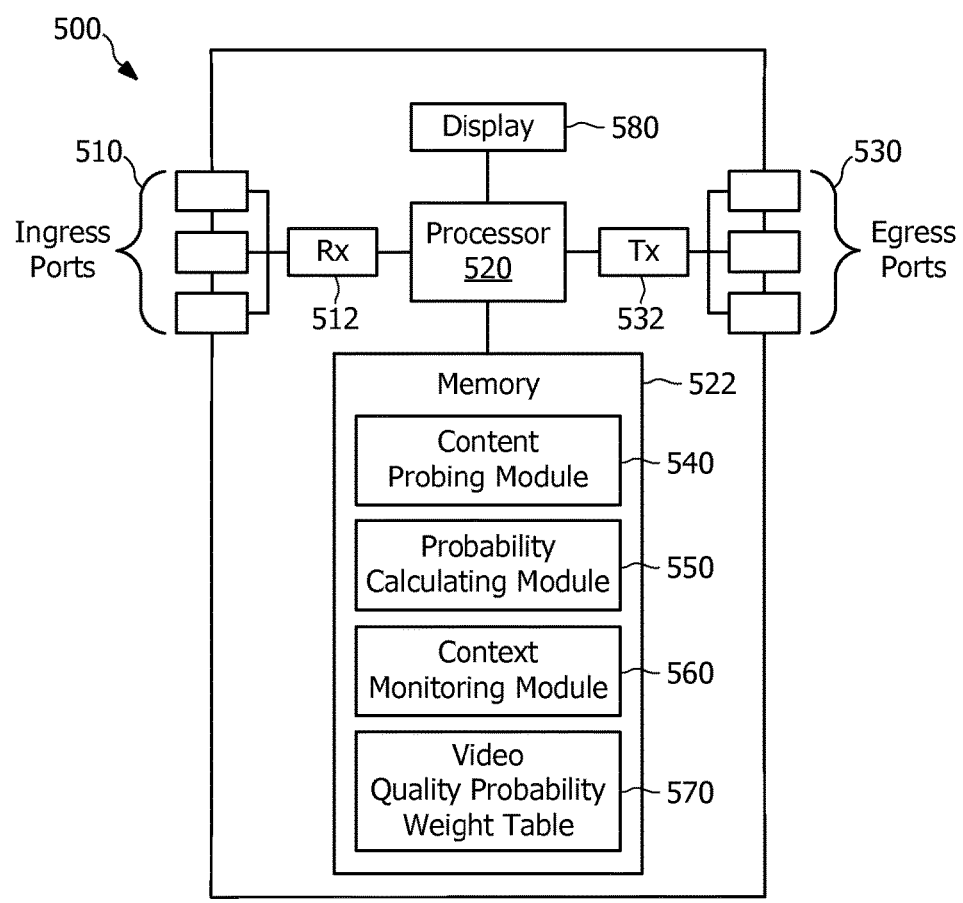
FIG. 5 is a schematic diagram of a network element (NE) according to an embodiment of the disclosure.

FIG. 5 is a schematic diagram of a network element (NE) 500 according to an embodiment of the disclosure. The NE 500 is suitable for implementing the video client 210, 310 of FIG. 2-3. The NE 500 includes ingress ports 510 and a receiver unit (Rx) 512 for receiving data, a processor 520 to process the data; a transmitter unit (Tx) 532 and egress ports 530 for transmitting the data; a memory 522 for storing the data; and a display 580 to present the data. The NE 500 may also include optical-to-electrical (OE) components and electrical-to-optical (EO) components coupled to the ingress ports 510, the Rx 512, the Tx 532, and the egress ports 530 for ingress or egress of optical or electrical signals. It should be noted that the ingress ports 510 and the egress ports 530 may be bidirectional ports and/or may be combined into a single bi-directional port in some embodiments.

The processor 520 may be implemented by hardware and software. The processor 520 may be implemented as one or more CPU chips, cores (for example, as a multi-core processor), field-programmable gate arrays (FPGAs), application specific integrated circuits (ASICs), and digital signal processors (DSPs). The processor 520 is in communication with the Rx 512, the Tx 532, the memory 522, and the display 580.

The memory 522 includes one or more disks, tape drives, and solid-state drives and may be used as an over-flow data storage device, to store programs when such programs are selected for execution, and to store instructions and data that are read during program execution. The memory 522 may be volatile and non-volatile and may be read-only memory (ROM), random-access memory (RAM), ternary content-addressable memory (TCAM), and static random-access memory (SRAM). In an embodiment, a content probing module 540 (e.g., the content probing module 340), a probability calculating module 550 (e.g., the probability calculating module 350), and a context monitoring module 560 (e.g., the context monitoring module 360) are implemented as instructions stored in the memory 522 such that when executed by the processor 520, or implemented in part in the processor 520 and in part in the memory 522 causes the processor 520 to perform the method 400. The video quality probability weight table 570 (e.g., the video quality probability weight table 370) generated by the probability calculating module 550 (e.g., the probability calculating module 350) is stored in the memory 522.

One or more of the modules disclosed herein (e.g., content probing module 340, context monitoring module 360, probability calculating module 350, content fetching module 330, decoding application module 375, etc.) and/or the video service application 320 may be implemented as software, hardware, firmware, or a combination thereof in, for example, the video client 310 or other network device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for video streaming over at least one information-centric network (ICN) implemented in a video client, comprising:
   transmitting, by the video client, a request for video content to a server;
   receiving, by the video client, a media presentation description (MPD) file corresponding to the video content from the server in response to the request for the video content, wherein the MPD file identifies names of copies of the video content in the at least one ICN, and wherein the copies of the video content represent different quality levels of the video content;
   probing, by the video client, a plurality of ICNs in a vicinity of the video client for the copies of the video content by searching the names of the copies via an ICN protocol;
   calculating, by the video client, a probability value for each copy of the video content by comparing results of the probing of the plurality of ICNs in the vicinity of the video client for each copy of the video content, the probability value indicating a likelihood a copy of the video content provides a particular video quality based on a current network condition; and
   fetching, by the video client, one of the copies of the video content based on the probability value calculated for each of the copies of the video content, the one of the copies of the video content that is fetched is a first probability ranked video content in a video quality probability table above a predetermined threshold.

2. The method of claim 1, wherein fetching the one of the copies of the video content based on the probability value calculated for each of the copies of the video content comprises outputting the probability values of the copies of the video content in the video quality probability table.

3. The method of claim 2, wherein fetching the one of the copies of the video content based on the probability value calculated for each of the copies of the video content further comprises ranking the copies of the video content in the video quality probability table in a decreasing order of probability values for each quality level from a highest quality level to a lowest quality level.

4. The method of claim 3, wherein fetching the one of the copies of the video content based on the probability value calculated for each of the copies of the video content further comprises:
   transmitting a request for the one of the copies of the video content; and
   receiving the one of the copies of the video content from the at least one ICN in response to the request for the one of the copies of the video content.

5. The method of claim 4, wherein the predetermined threshold corresponds to de-jitter buffer utilization.

6. The method of claim 1, further comprising displaying the one of the copies of the video content following receipt of the one of the copies of the video content.

7. The method of claim 1, further comprising monitoring environmental changes during probing the plurality of ICNs in the vicinity of the video client for the copies of the video content.

8. The method of claim 1, wherein the results of the probing comprise round-trip time (RTT) of probing the plurality of ICNs in the vicinity of the video client for each of the copies of the video content.

9. A video client, comprising:
   a transmitter configured to transmit a request for video content to a server; and
   a processor operably coupled to a memory and the transmitter, the processor configured to:
   receive a media presentation description (MPD) file corresponding to the video content from the server in response to the request for the video content, wherein the MPD file identifies names of copies of the video content in at least one Information-Centric Network (ICN), and wherein the copies of the video content represent different quality levels of the video content;

probe a plurality of ICNs in a vicinity of the video client for the copies of the video content by searching the names of the copies via an ICN protocol;

calculate a probability value corresponding to a copy of the video content at one of the different quality levels for each of the copies of the video content by comparing results of the probing for each copy of the video content, the probability value indicating a likelihood the copy of the video content provides a particular video quality based on a current network condition; and fetch one of the copies of the video content based on the probability value calculated for each of the copies of the video content, the one of the copies of the video content that is fetched is a first probability ranked video content in a video quality probability table above a predetermined threshold.

10. The video client of claim 9, wherein fetching the one of the copies of the video content based on the probability value calculated for each of the copies of the video content comprises outputting the probability values of the copies of the video content in the video quality probability table.

11. The video client of claim 10, wherein fetching the one of the copies of the video content based on the probability value calculated for each of the copies of the video content further comprises ranking the video quality probability table in a decreasing order of the probability values for each quality level from a highest quality level to a lowest quality level.

12. The video client of claim 11, wherein fetching the one of the copies of the video content based on the probability value calculated for each of the copies of the video content further comprises:

transmit a request for the one of the copies of the video content; and receive the one of the copies of the video content from the at least one ICN in response to the request for the one of the copies of the video content.

13. The video client of claim 12, wherein the predetermined threshold corresponds to de-jitter buffer utilization.

14. The video client of claim 13, wherein the processor is configured to display the one of the copies of the video content following receipt of the one of the copies of the video content.

15. The video client of claim 9, wherein the processor is configured to monitor environmental changes during probing of the plurality of ICNs in the vicinity of the video client for the copies of the video content.

16. The video client of claim 9, wherein the results of the probing comprises round-trip time (RTT) of probing the plurality of ICNs in the vicinity of the video client for each of the copies of the video content.

17. A video client, comprising:

a video service application configured to:

transmit a request for video content to a server; and receive a media presentation description (MPD) file corresponding to the video content from the server in response to the request, wherein the MPD file identifies names of copies of the video content in at least one Information-Centric Network (ICN), and wherein the copies of the video content represent different quality levels of the video content;

a content probing module operably coupled to the video service application and configured to probe a plurality of ICNs in a vicinity of the video client for the copies of the video content by searching the names of the copies via an ICN protocol; and a probability value calculating module operably coupled to the content probing module and configured to:

calculate a probability value corresponding to a copy of the video content being available at one of the different quality levels for each of the copies of the video content by comparing results of the probing for each copy of the video content, the probability value indicating a likelihood the copy of the video content provides a particular video quality based on a current network condition; and output the probability value for each of the copies of the video content in a video quality probability table, the video quality probability table permitting one of the copies of the video content to be fetched, the one of the copies of the video content that is fetched is a first probability ranked video content in the video quality probability table above a predetermined threshold.

18. The video client of claim 17, wherein the predetermined threshold corresponds to de-jitter buffer utilization.

19. The video client of claim 17, further comprising a content fetching module configured to proactively upgrade or degrade video content quality based on de-jitter occupancy by consulting the video quality probability table.

20. The video client of claim 17, wherein the probability value calculating module is operably coupled to a content fetching module and configured to:

advise the content fetching module of a higher quality video content relative to previously fetched video content; and recommend that the content fetching module upgrade to the higher quality video content.

21. The video client of claim 17, further comprising a context monitoring module configured to:

monitor environmental changes; and inform at least one of the content probing module and a content fetching module of the environmental changes.

22. The video client of claim 17, wherein the probability value calculating module is further configured to rank the video quality probability table in a decreasing order of the probability values for each quality level from a highest quality level to a lowest quality level following output of the probability values.

23. The method of claim 1, wherein the video client communicates with the at least one ICN via a strategy layer routing of the ICN protocol.

* * * * *